(12) United States Patent
van der Made

(10) Patent No.: US 11,151,441 B2
(45) Date of Patent: Oct. 19, 2021

(54) SYSTEM AND METHOD FOR SPONTANEOUS MACHINE LEARNING AND FEATURE EXTRACTION

(71) Applicant: Brainchip Inc., Aliso Viejo, CA (US)

(72) Inventor: Peter A J van der Made, Aliso Viejo, CA (US)

(73) Assignee: BRAINCHIP, INC., Aliso Viejo, CA (US)

( * ) Notice: Subject to any disclaimer, the term of this patent is extended or adjusted under 35 U.S.C. 154(b) by 593 days.

(21) Appl. No.: 15/428,073

(22) Filed: Feb. 8, 2017

(65) Prior Publication Data

US 2018/0225562 A1    Aug. 9, 2018

(51) Int. Cl.
| | | |
|---|---|---|
| *G06N 3/04* | (2006.01) | |
| *G06N 3/063* | (2006.01) | |
| *G06N 3/08* | (2006.01) | |
| *G06N 20/00* | (2019.01) | |

(52) U.S. Cl.
CPC ............ *G06N 3/049* (2013.01); *G06N 3/0454* (2013.01); *G06N 3/063* (2013.01); *G06N 3/088* (2013.01); *G06N 20/00* (2019.01)

(58) Field of Classification Search
CPC ...................................................... G06N 3/049
See application file for complete search history.

(56) References Cited

U.S. PATENT DOCUMENTS

| | | |
|---|---|---|
| 5,063,601 A | 11/1991 | Hayduk |
| 5,659,666 A | 8/1997 | Thaler |
| 5,680,481 A | 10/1997 | Prasad et al. |
| 6,233,365 B1 | 5/2001 | Teruhiko |
| 6,247,002 B1 | 6/2001 | Steels |

(Continued)

FOREIGN PATENT DOCUMENTS

| | | |
|---|---|---|
| WO | WO 2016/048743 A1 | 3/2016 |
| WO | WO 2017/003491 A1 | 1/2017 |

OTHER PUBLICATIONS

Querlioz, Damien, et al. "Bioinspired networks with nanoscale memristive devices that combine the unsupervised and supervised learning approaches."2012 IEEE/ACM International Symposium on Nanoscale Architectures (NANOARCH). IEEE, 2012. (Year: 2012).*

(Continued)

*Primary Examiner* — Luis A Sitiriche
*Assistant Examiner* — Sehwan Kim
(74) *Attorney, Agent, or Firm* — Sterne, Kessler, Goldstein & Fox P.L.L.C.

(57) ABSTRACT

Embodiments of the present invention provide an artificial neural network system for improved machine learning, feature pattern extraction and output labeling. The system comprises a first spiking neural network and a second spiking neural network. The first spiking neural network is configured to spontaneously learn complex, temporally overlapping features arising in an input pattern stream. Competitive learning is implemented as Spike Timing Dependent Plasticity with lateral inhibition in the first spiking neural network. The second spiking neural network is connected with the first spiking neural network through dynamic synapses, and is trained to interpret and label the output data of the first spiking neural network. Additionally, the output of the second spiking neural network is transmitted to a computing device, such as a CPU for post processing.

19 Claims, 7 Drawing Sheets

(56) References Cited

U.S. PATENT DOCUMENTS

| | | | |
|---|---|---|---|
| 7,933,451 | B2 | 4/2011 | Kloer |
| 8,045,418 | B2 | 10/2011 | Suzuki |
| 8,250,011 | B2 | 8/2012 | Van Der Made |
| 8,346,692 | B2 | 1/2013 | Rouat et al. |
| 9,129,221 | B2 | 9/2015 | Piekniewski et al. |
| 9,208,432 | B2 | 12/2015 | Buibas et al. |
| 9,224,090 | B2 * | 12/2015 | Piekniewski .......... G06N 3/088 |
| 9,239,985 | B2 | 1/2016 | Piekniewski |
| 2010/0081958 | A1 | 4/2010 | Christy |
| 2013/0297539 | A1 | 11/2013 | Piekniewski et al. |
| 2014/0081895 | A1 | 3/2014 | Coenen et al. |
| 2014/0122398 | A1 | 5/2014 | Richert |
| 2014/0365414 | A1 | 12/2014 | Richert et al. |
| 2015/0063575 | A1 | 3/2015 | Tan |
| 2015/0066820 | A1 | 3/2015 | Kapur et al. |
| 2015/0204559 | A1 | 7/2015 | Steven |
| 2015/0269482 | A1 | 9/2015 | Annapureddy et al. |
| 2015/0278641 | A1 | 10/2015 | Agrawal et al. |
| 2015/0278680 | A1 | 10/2015 | Annapureddy et al. |
| 2015/0379397 | A1 * | 12/2015 | van der Made ....... G06N 20/00 706/20 |
| 2016/0086076 | A1 | 3/2016 | Alvarez-Icaza Rivera et al. |
| 2016/0210552 | A1 | 7/2016 | Kasabov et al. |
| 2016/0267359 | A1 | 9/2016 | Gan et al. |
| 2017/0024644 | A1 | 1/2017 | Van Der Made et al. |
| 2017/0024877 | A1 | 1/2017 | Dillon et al. |
| 2017/0236027 | A1 | 8/2017 | Van Der Made et al. |

OTHER PUBLICATIONS

Querlioz, Damien, Olivier Bichler, and Christian Gamrat. "Simulation of a memristor-based spiking neural network immune to device variations." The 2011 International Joint Conference on Neural Networks. IEEE, 2011. (Year: 2011).*

Arthur, John V., et al. "Building block of a programmable neuromorphic substrate: A digital neurosynaptic core." the 2012 international joint conference on Neural networks (IJCNN). IEEE, 2012. (Year: 2012).*

Blessinger, Michael A., et al. "Performance of focal plane arrays for the photon counting arrays (PCAR) program." Infrared Technology and Applications XXXIII. vol. 6542. International Society for Optics and Photonics, 2007. (Year: 2007).*

Merolla, Paul, et al. "A digital neurosynaptic core using embedded crossbar memory with 45pJ per spike in 45nm."2011 IEEE custom integrated circuits conference (CICC). IEEE, 2011. (Year: 2011).*

Forssell, Mats. "Hardware implementation of artificial neural networks." Information Flow in Networks 18 (2014): 1-4. (Year: 2014).*

Chartier, "Autonomous Perceptual Feature Extraction in a Topology-Constrained Architecture." Proceedings of the 30th Annual Conference of the Cognitive Science, Society University of Ottawa p. 1868-1873 Jul. 23-26, 2008.

Bichler, "Extraction of Temporally Correlated Features from Dynamic Vision Sensors with Spike-Timing-Dependent Plasticity." Neural Networks 32: 339-348 Aug. 1, 2012.

Várkonyi-Kóczy, "Intelligent Autonomous Primary 3D Feature extraction in Vehicle System Dynamics Analysis: Theory and Application." Acta Polytechnica Hungarica 5(1): 5-29 Jan. 1, 2008.

Qiao et al. ("A reconfigurable on-line learning spiking neuromorphic processor comprising 256 neurons and 128K synapses", Frontiers in Neuroscience www.frontiersin.org, Apr. 2015 | vol. 9 | Article 141), 2015, 17 pages.

Wolf, "Lipreading by neural networks: Visual preprocessing, learning and sensory integration." Advances in Neural Information Processing Systems 6: 1027-1034 Jan. 1, 1994.

Tolson, "Machine Learning in the area of image analysis and pattern recognition." Advanced Undergraduate Project, Spring 2001, 35 pages.

Wu, "Processing visual stimuli using hierarchical spiking neural networks." Neurocomputing 71(10): 2055-2068, Jun. 1, 2008.

Girau, "FPGA implementation of an integrate-and-fire LEGION model for image segmentation." European Symposium on Artificial Neural Networks Bruges (Belgium) Apr. 26, 2006, 6 pages.

Rowcliffe, "Clustering within Integrate-and-Fire Neurons for Image Segmentation." Artificial Neural Networks—ICANN 2002 Lecture Notes in Computer Science 245:69-74 Aug. 28, 2002.

Non-Final Office Action directed to U.S. Appl. No. 15/435,264, dated Jan. 2, 2019; 7 pages.

Final Office Action directed to U.S. Appl. No. 15/435,264, dated Dec. 31, 2019; 20 pages.

Non-Final Office Action directed to U.S. Appl. No. 15/435,264, dated Jun. 17, 2019; 19 pages.

Non-Final Office Action directed to U.S. Appl. No. 15/435,264, dated Aug. 13, 2020; 16 pages.

Final Office Action directed to U.S. Appl. No. 15/431,606, dated Jun. 19, 2020; 44 pages.

Non-Final Office Action directed to U.S. Appl. No. 15/431,606, dated Oct. 3, 2019; 43 pages.

Non-Final Office Action directed to U.S. Appl. No. 15/435,264, dated May 19, 2021; 21 pages.

* cited by examiner

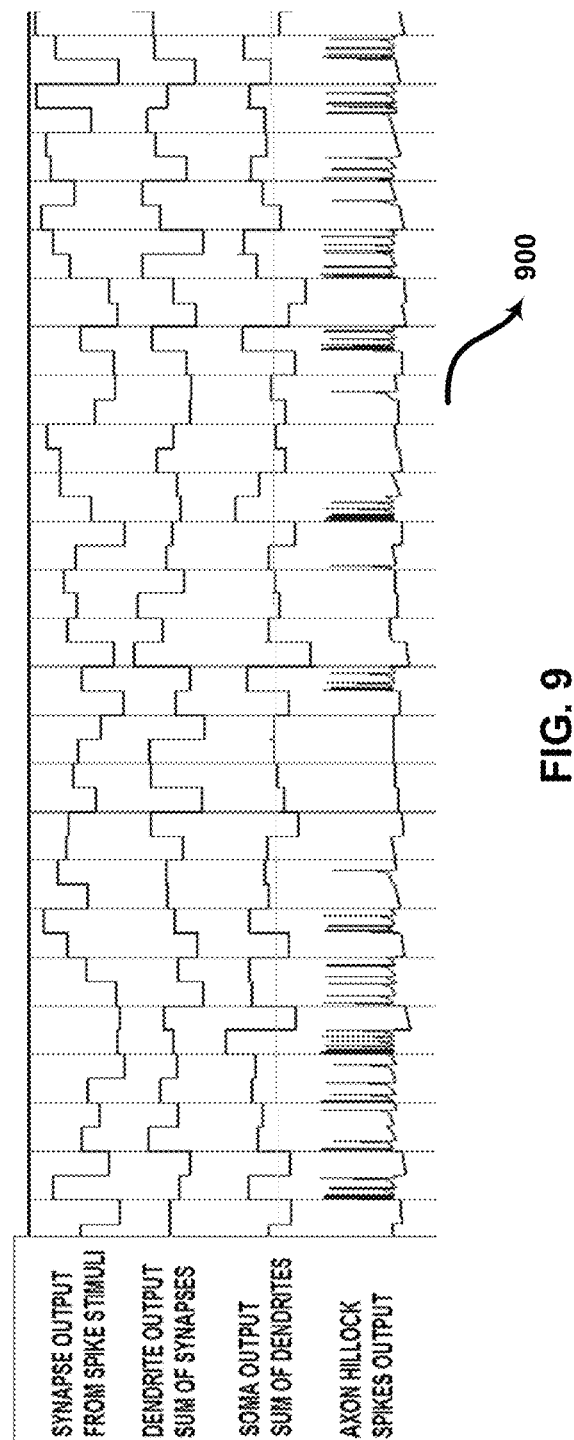

SYSTEM AND METHOD FOR SPONTANEOUS MACHINE LEARNING AND FEATURE EXTRACTION

FIELD OF THE INVENTION

The present invention generally relates to an improved method for machine learning and automated pattern recognition using neural networks and more particularly to a dynamic machine learning and feature extraction system using a multilayer Spiking Neural Network with a Spike Timing Dependent Plasticity learning rule capable of spontaneous learning.

BACKGROUND

The goal of machine learning and automated feature extraction is to design a system that approaches the human ability to learn spontaneously and subsequently recognize objects from visual, audio, olfactory and other sensory data streams. Human perception goes through several stages, from low-level feature extraction to perceptual interpretation higher regions. Spontaneous learning and then extracting features in still and streaming images, or matching sound patterns in streaming audio and other sensory streams are valuable pattern recognition tasks, useful in safety and security monitoring systems, unmanned vehicles, robotic vision, acoustic and behavior recognition. Accurate detection of objects is a challenging task due to lighting changes, shadows, occlusions, noise and convoluted backgrounds. Principal computational approaches use either template matching with hand-designed features, reinforcement learning, or trained deep convolutional networks of artificial neurons and combinations thereof. Vector processing systems generate values, indicating color distribution, intensity and orientation from the image. These values are known as vectors and indicate the presence or absence of a defined object. Reinforcement learning networks learn by means of a reward or cost function. The reinforcement learning system is configured to either maximize the reward value or minimize the cost value and the performance of the system is highly dependent on the quality and conditions of these hand-crafted features. Deep convolutional neural networks learn by means of a technique called back-propagation, in which errors between expected output values for a known and defined input, and actual output values, are propagated back to the network by means of an algorithm that updates synaptic weights with the intent to minimize the error. The Deep Learning method requires millions of labelled input training models, resulting in long training times, and clear definition of known output values. However, these methods are not useful when dealing with previously unknown features or in the case whereby templates are rapidly changing or where the features are flexible. The field of neural networks is aimed at developing intelligent learning machines that are based on mechanisms which are assumed to be related to brain function. U.S. Pat. No. 8,250,011 describes a system based on artificial neural network learning. The system comprises a dynamic artificial neural computing device that is capable of approximation, autonomous learning and strengthening of formerly learned input patterns. The device can be trained and can learn autonomously owing to the artificial spiking neural network that is intended to simulate or extend the functions of a biological nervous system. Since, the artificial spiking neural network simulates the functioning of the human brain; it becomes easier for the artificial neural network to solve computational problems.

US20100081958 describes a more advanced version of machine learning and automated feature extraction using neural network. US20100081958 is related to pulse-based feature extraction for neural recordings using a neural acquisition system. The neural acquisition system includes the neural encoder for temporal-based pulse coding of a neural signal, and a spike sorter for sorting spikes encoded in the temporal-based pulse coding. The neural encoder generates a temporal-based pulse coded representation of spikes in the neural signal based on integrate-and-fire coding of the received neural signal and can include spike detection and encode features of the spikes as timing between pulses such that the timing between pulses represents features of the spikes.

However, the prior art do not disclose any system or method which can implement machine learning or training algorithm and can autonomously extract features and label them as an output without implementing lengthy training cycles. In view of the aforementioned reasons, there is therefore a need for improved techniques in spontaneous machine learning, eliminating the need for hand-crafted features or lengthy training cycles. Spontaneous Dynamic Learning differs from supervised learning in that known input and output sets are not presented, but instead the system learns from repeating patterns (features) in the input stream.

SUMMARY

In a first aspect of the invention, a digital system for spontaneous machine learning and feature extraction is provided. The system comprising: a hierarchical arrangement of a first artificial neural network and a second artificial neural network, said first artificial neural network spontaneously learns to recognize any repeating pattern in an input stream and the second artificial neural network is trained to interpret and label the response from the first artificial neural network. The first artificial neural network spontaneously learns the repeating pattern through a combination of Spike Timing Dependent Plasticity (STDP) in dynamic synapses and lateral inhibition between neurons. Synapses receive inputs from the pre-synaptic neuron and the post-synaptic neuron. During each cycle of the Neural Network, the synapses that received spikes from the pre-synaptic neuron that contributed to an output event in the post-synaptic neuron have their weight values increased, while all other synapses, connected to the same post-synaptic neuron have their weights reduced. This changes the response of the neuron, increasing the likelihood that the neuron activates, and thus produces an output spike, when the same pattern reoccurs. The synaptic weights of all neurons that did not activate are not updated. This causes the neurons to become selective to a specific pattern after only three to five repetitions. On each activation, the neighboring neurons are inhibited so that each neuron learns a unique pattern. Multiple neurons may activate on patterns that in combination constitute a feature.

The first artificial neural network and the second artificial neural network are single layered or a multilayered hierarchical spiking neural network. The labeling of repeating patterns by the second artificial neural network is carried out by mapping temporally and spatially distributed spikes, generated by the first neural network and representing learned features to output labels within a predetermined knowledge domain. The system further comprises an input unit having a network of artificial sensory neurons connected to the first artificial neural network, said input unit converts the data captured in form of changes in contrast, specific frequency domains or digital or analog values by a sensor array into temporally and spatially distributed spikes. This sensory neuron layer is not required where the sensory data source produces temporal and spatial distributed spikes. A spike is defined as a short burst of electrical energy that has precise timing relative to other such spikes. Data is represented in the timing and distribution of spikes. The sensor array comprises a plurality of sensors for capturing data of interest and generating the input stream. The first artificial neural network and the second artificial neural network comprises a plurality of digital neuron circuits interconnected by a plurality of dynamic synapse circuits. The first artificial neural network spontaneously learns by means of STDP and lateral inhibition to create the predetermined knowledge domain comprising of a plurality of weights representing the learned features in the input stream. The second artificial neural network is configured to function in a supervised manner and is trained to produce input/output maps within the predetermined knowledge domain. The second artificial neural network comprises a monitoring means to identify outputs that meet predefined criteria. The second artificial neural network transmits the output labels to a computing device, such as a central processing unit, for post processing. The plurality of sensors are analog or digital sensors, such as vision sensors, digital microphones, tactile pressure sensors, chemical sensors and the sensors that are outside of human perception such as a radar or an ultrasound.

In a second aspect of the present invention, a method for spontaneously learning and extracting features in an artificial neural network system is provided. The method comprising: feeding an input pattern stream from a sensor to a first artificial neural network; learning, spontaneously, by the first artificial neural network to recognize any repeating patterns in the input stream and perform feature extraction; sending temporally and spatially distributed spikes, representing the recognized patterns to a second neural network from the first artificial neural network; labeling the recognized pattern received from the first artificial neural network, by the second artificial neural network; and sending labeled output representing each recognized pattern to a computing device for post processing. The first artificial neural network and the second artificial neural network comprises a plurality of digital neuron circuits interconnected by a plurality of dynamic synapse circuits. The first artificial neural network and the second artificial neural network comprises either a single layer or multilayer of digital neuron circuits. The first artificial neural network spontaneously learns by means of STDP and lateral inhibition to create the predetermined knowledge domain comprising of a plurality of weights representing the learned features in the input stream. The second artificial neural network is configured to function in a supervised manner and is trained to produce input/output maps within the predetermined knowledge domain. The second artificial neural network comprises a monitoring means to identify outputs that meet a predefined criterion. The second artificial neural network transmits the output labels to a computing device, such as a central processing unit, for post processing.

BRIEF DESCRIPTION OF DRAWINGS

The preferred embodiment of the invention will hereinafter be described in conjunction with the appended drawings provided to illustrate and not to limit the scope of the invention, wherein like designation denotes like element and in which:

FIG. 9 illustrates a CAD system simulation output chart, showing the behavior of synapses, dendrites and soma, in accordance with an embodiment of the present invention.

DETAILED DESCRIPTION

In the following detailed description of embodiments of the invention, numerous specific details are set forth in order to provide a thorough understanding of the embodiments of the invention. However, it will be obvious to a person skilled in art that the embodiments of the invention may be practiced with or without these specific details. In other instances, well known methods, procedures and components have not been described in details, so as not to unnecessarily obscure aspects of the embodiments of the invention.

Furthermore, it will be clear that the invention is not limited to these embodiments only. Numerous modifications, changes, variations, substitutions and equivalents will be apparent to those skilled in the art, without parting from the spirit and scope of the invention.

In an embodiment of the present invention, a system for feature extraction using two or more artificial neural networks implemented in a digital hardware is provided. The system comprises a first spiking neural network and a second spiking neural network arranged in a hierarchical manner and is configured to process the information. The system is configured to receive and process information from a variety of sources in a variety of forms, such as an image source, video source from an image sensor or from a source that is outside human perception such as a radar or ultrasound images. Each of the first spiking neural network and the second spiking neural network comprises a plurality of digital artificial neurons connected to each other through digital synapses. The first spiking neural network spontaneously and spontaneously learns to recognize repeating patterns in the input streams and the second spiking neural network performs data labeling for each pattern recognized by the first spiking neural network.

The information transacted within the system is expressed as spikes, which are defined as short pulses of electrical energy that have precise timing and a defined temporal and spatial distribution. Spontaneous learning by the first spiking neural network is performed through a combination of Spike Time Dependent Plasticity (STDP) process and lateral inhibition, and it occurs to selectively increase or decrease a synaptic weight values within the system, as a result of the temporal difference of an input spike temporally related to a soma feedback output spike. The labeled data from the second spiking neural network is then made available as an output to a microprocessor or a computer system.

Figure 1:
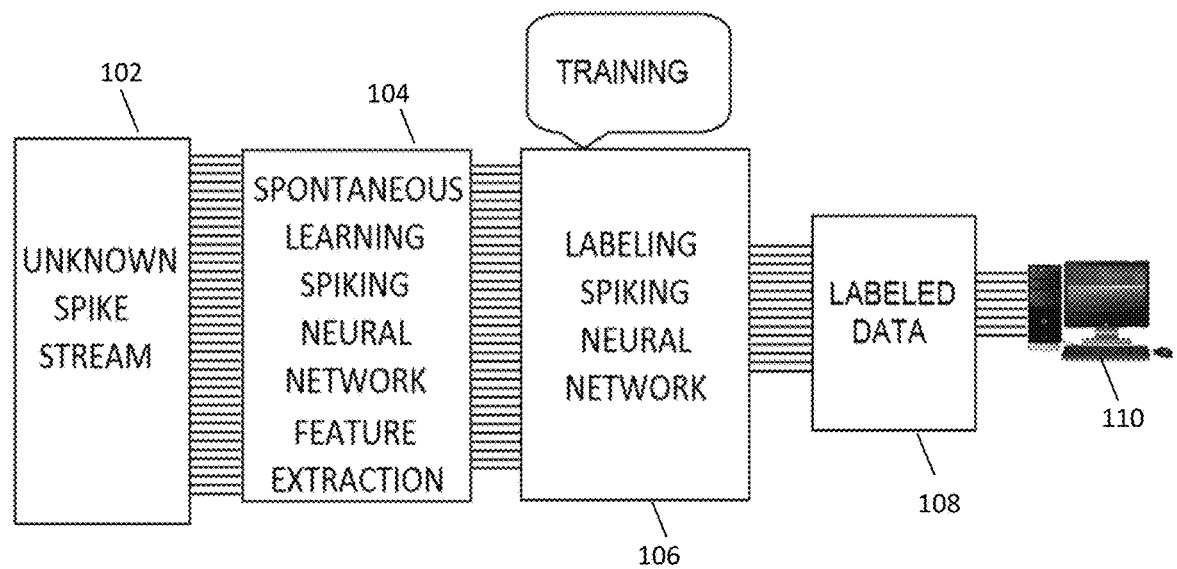
FIG. 1 illustrates a schematic representation of a spontaneous learning neural network and an output labeling network, in accordance with an embodiment of the present invention.

FIG. 1 illustrates a schematic representation of a spontaneous learning neural network and an output labeling network, in accordance with an embodiment of the present invention. The system comprises a spontaneous learning neural network and an output labeling neural network. The information transacted within the system is expressed as spikes. An unknown spike stream 102 is fed into the system through a network of sensory neurons or a network of input neurons. The unknown input spike streams can be an image stream, an audio stream, a video stream or any known stream beyond the perception of a human being. The unknown spike stream 102 is an output of a sensor or a detector which is used to sense or detect data flowing from an external process. The unknown spike stream can be in form of data, sensor data, visual data or data from detectors such as an ultrasound or an x-ray. The dataset of the unknown spike streams is converted into temporally and spatially distributed spikes by the sensory neurons and fed into the spontaneous learning spiking neural network feature extraction 104. The spontaneous learning spiking neural network feature extraction 104 spontaneously learns to recognize any repeating pattern in the input streams and subsequently performs feature extraction. The spontaneous learning spiking neural network feature extraction uses Synaptic Time Dependent Plasticity and inhibition for creating a knowledge domain comprised of a plurality of weights representing learned, repeating features arising in the input unknown spike streams.

The labeling spiking neural network 106 receives temporally and spatially distributed spikes from the spontaneous learning spiking neural network feature extraction 104. The labeling spiking neural network 106 comprises a spiking neural network that can be trained in a supervised manner to map learned features into output labels. The labeled data 108 from the labeling neural network 106 can then be used by a microcontroller or a computer system 110.

Figure 2:
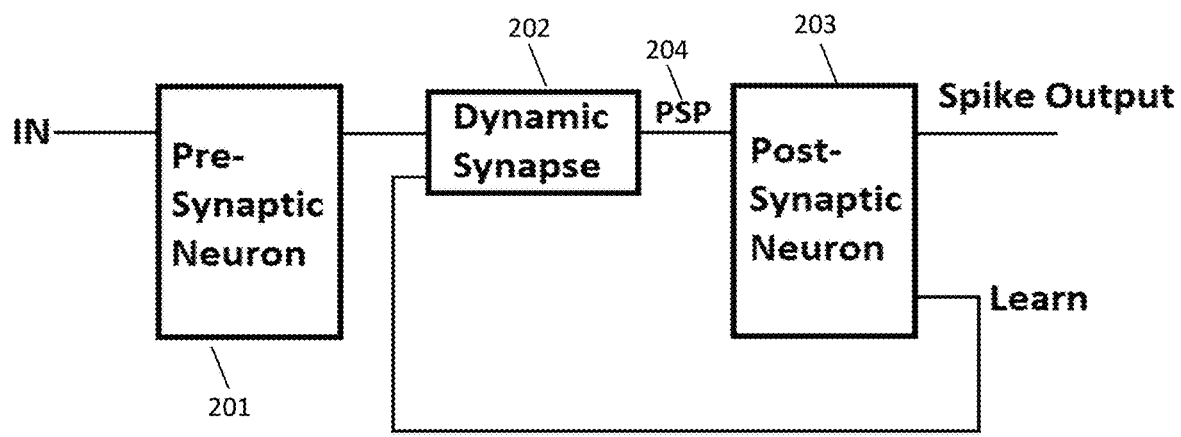
FIG. 2 illustrates a schematic representation of connections between a pre-synaptic neuron and a post-synaptic neuron by means of a dynamic synapse, and an additional input to the dynamic synapse from the post-synaptic neuron.

FIG. 2 illustrates a schematic representation of connections between a pre-synaptic neuron and a post-synaptic neuron by means of a dynamic synapse and an additional input to the dynamic synapse from the post-synaptic neuron, in accordance with an embodiment of the present invention. FIG. 2 illustrates that the pre-synaptic neuron 201 and the post-synaptic neuron 203 are connected by means of the dynamic synapse 202 and capable of spontaneous learning. The dynamic synapse 202 receives spiking inputs from both the pre-synaptic neuron 201 and the post-synaptic neuron 203, and outputs a decaying value 204 to the post-synaptic neuron 203.

Figure 3:
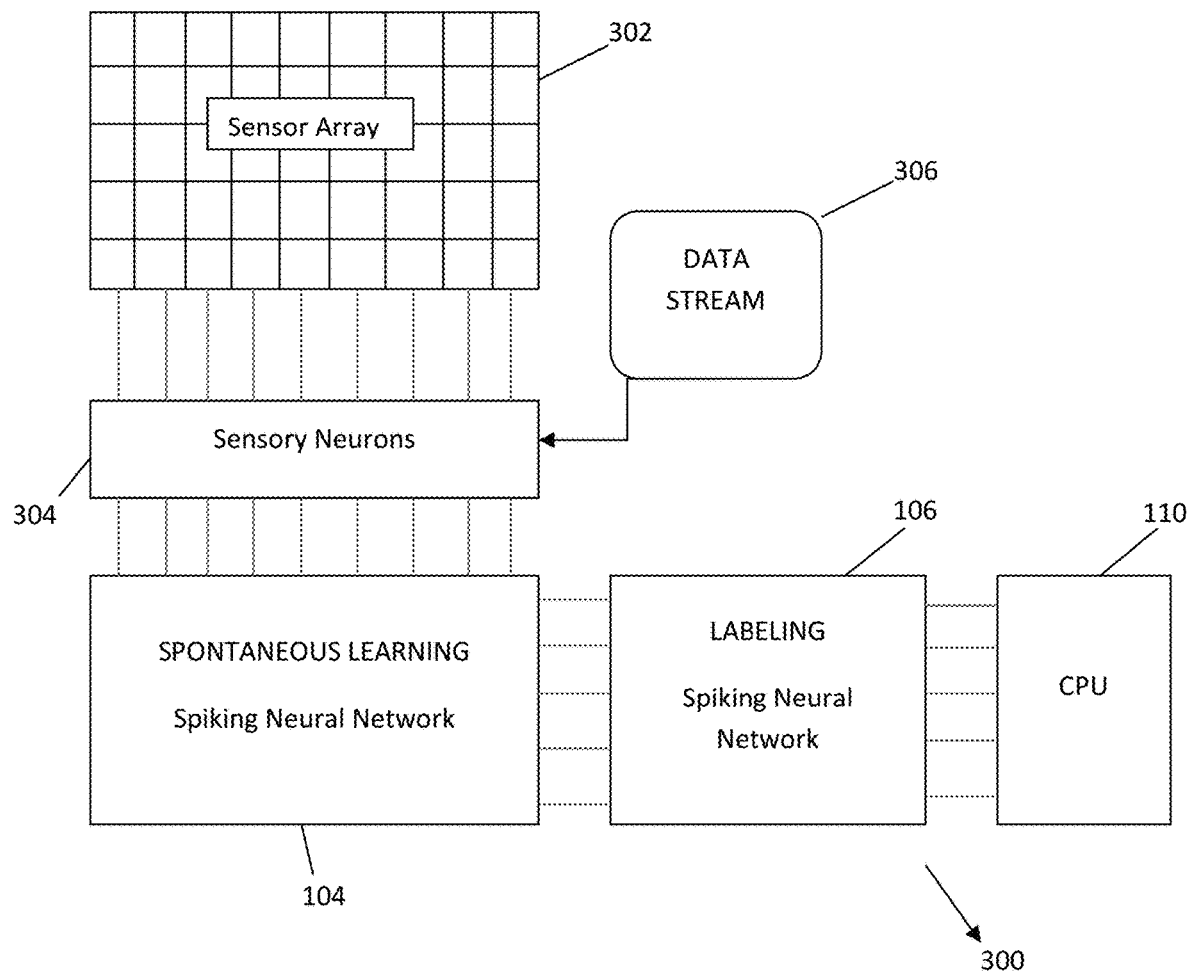
FIG. 3 illustrates an architecture of a spontaneous machine learning and feature extraction device showing a first spiking neural network and a second spiking neural network, in accordance with an embodiment of the present invention.

FIG. 3 illustrates an architecture of a spontaneous machine learning and feature extraction device showing a first spiking neural network and a second spiking neural network, in accordance with an embodiment of the present invention. A sensor array 302 having one or more sensors or detectors is connected to a network of sensory neurons 304. An optional input data stream 306 is fed into the network of sensory neurons 304. Sensory neurons 304 output a stream of temporally and spatially distributed spikes to a spontaneous learning Spiking Neural Network 104. The spontaneous learning Spiking Neural network (as a first spiking neural network) 104 performs a second function of feature extraction and transmits spikes indicating identified features to a labeling spiking neural network (as a second spiking neural network) 106. The first spiking neural network 104 receives spikes from either an external source, or from sensory neuron network. When an optional data stream 306 is connected, the network of sensory neurons 304 converts the data or values into temporally and spatially distributed spikes representing the corresponding value. The first spiking neural network 104 learns spontaneously to identify any repeating patterns that are present in the input stream, and extracts these features from the input data stream 306 and sends spikes representing the occurrence of these patterns to the second spiking neural network 106. The second spiking neural network 106 identifies the output (i.e. the spikes representing the extracted features) from the first spiking neural network 104 and labels the extracted features. The labeled data is then transferred to a control and processing unit 110 of a computer system. Therefore, the first spiking neural network 104 learns and recognizes the features in an input stream of spatially and temporally distributed spikes while the second spiking neural network 106 labels the recognized features.

The first spiking artificial neural network 104 is configured to learn spontaneously to recognize repeating patterns in the input data stream, by means of a learning method known as Synaptic Time Dependent Plasticity and lateral inhibition. Thereby, a knowledge domain is created that comprises of a plurality of weights representing learned features arising in the input stream. The input data stream 306 can originate from an external source, or from the connected sensor array 302.

The sensor array 302 provides a defined, but unlabeled input pattern stream that is fed to the first spiking neural network 104 of the system 300. Examples of sensors include and are not limited to analog or digital sensors, such as vision sensors, digital microphones, tactile pressure sensors, chemical sensors and other types of sensors or data sources. The plurality of digital artificial spiking neurons of the first spiking neural network 104 is connected by means of the dynamic sensory neurons 304 to the sensor array 302. In an embodiment, the sensor array 302 may be connected directly to the first spiking neural network 104, wherein the sensor array 302 provides a stream of temporal and spatially distributed spikes, comprising of defined but unlabeled pattern streams.

If the input stream is the data stream 306, the network of artificial sensory neurons 304 converts the input streams into digital spikes. Hence, temporal and spatial distributed spike patterns are generated first, that represent values in the input data stream 306. The artificial sensory neurons 304 fire spikes at different temporal distributions depending on the data that they received.

The temporally and spatially distributed output spikes of the artificial sensory neurons 304 are then forwarded as an input to the first spiking neural network 104 that performs the spontaneous learning and the feature extraction functions. Feature extraction is also known as unsupervised feature learning. The first spiking neural network 104 learns the repeating features in the input data stream 306 that characterizes an applied dataset through a function known as Spike Timing Dependent Plasticity (commonly abbreviated as STDP). STDP modifies the characteristics of the synapses depending on the timing of pre-synaptic spikes to post-synaptic spikes. The first spiking neural network utilizes lateral inhibition. In lateral inhibition, the first neuron, to respond to a specific pattern, inhibits other neurons within the same lateral layer in order for these neurons to learn different features. In the present embodiment, the applied dataset may contain the features of handwritten characters. Thus, the feature extraction module, which is the first neural network 104, learns the features of letters, digits, patterns, and sequences of data. It may be obvious to a person skilled in the art, that the applied dataset may contain other features, such as financial data, analogous and digital sensor information, etc. without departing from the meaning and scope of the present invention. Lastly, the STDP learning rule may be switched off when all the desired features have been learned, that is, there are no more synapses available for learning.

When the first spiking neural network 104 has learned, and recognized features in the input pattern stream 306, the first spiking neural network 104 feeds temporally and spatially distributed spikes to the second spiking neural network 106. The second spiking neural network 106 comprises a spiking neural network that can be trained in a supervised manner to map the learned features into output labels. For instance, in the case of handwritten characters, the output labels are indicative of letters and digits that the first spiking neural network 104 has learned to recognize. Thereafter, the output labels can be transmitted to an external device like the Central Processing Unit (CPU) 110 for post processing.

The identification of output spikes from the first spiking neural network 104 is performed by a monitoring means, which is the second spiking neural network 106. The second spiking neural network 106 is trained to identify outputs that meet predefined criteria. The second spiking neural network 106 is further trained to produce input-output maps within a predetermined knowledge domain, wherein the identification of outputs is indicative of production of useful information by the first spontaneous learning neural network. The outputs of the first spiking artificial neural network 104 are identified by the second spiking neural network 106 that represents labeled data.

The spontaneous learning and feature extraction system 300 implements spiking neural networks for autonomous and spontaneous learning of repeating features in an input stream. Feature extraction is a process of learning, detecting and mapping repeating features to actionable data, suitable to be processed by a computer. The first spiking neural network 104 spontaneously learns to recognize any repeating pattern in one or more input data streams and thus performs feature extraction, and the second spiking neural network 106 performs data labeling for patterns recognized by the first neural network 104. The labeled data may be then made available as an actionable output to a microprocessor or a computer system, as required.

In an embodiment of the present invention, the first spiking neural network 104 and the second spiking neural network 106 may be multi-layer or single layer neural networks for the processing of information.

Figure 4:
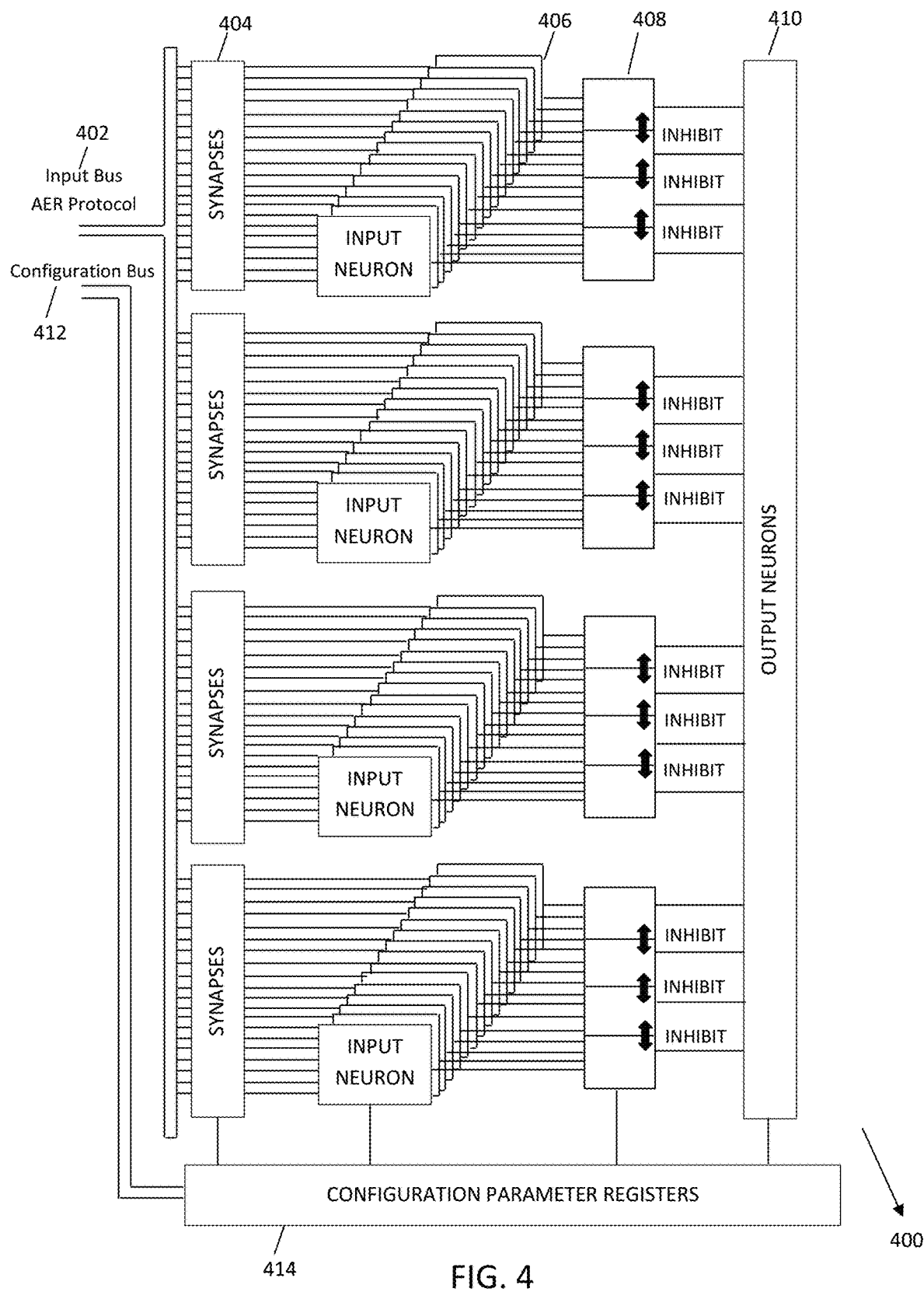
FIG. 4 illustrates an artificial neuron network used in the first spiking neural network and the second spiking neural network, in accordance with an embodiment of the present invention.

FIG. 4 illustrates an artificial neural network used in the first spiking neural network and the second spiking neural network in accordance with an embodiment of the present invention. An input bus 402 is in the current embodiment a fast serial bus, and spikes are passed from an external source, a sensor array, or a sensory neuron network, encoded in the Address Event Representation (AER) which is an industry standard. The AER bus is decoded and provides temporally and spatially distributed spikes to a plurality of dynamic synapses 404 connected to a second plurality of input neurons 406. This plurality of input neurons is connected through a third plurality of dynamic synapses to a plurality of intermediate neurons 408 with lateral inhibition. Output neurons 410 are connected to the intermediate neurons through a plurality of dynamic synapses, and produce an output stream of labeled actionable data 108 to a computer system or microprocessor 110. A separate serial data bus 412 passes configuration parameters to a configuration parameter registers 414 located in each of the plurality of synapses 404 and second plurality of neurons 406.

Figure 5:
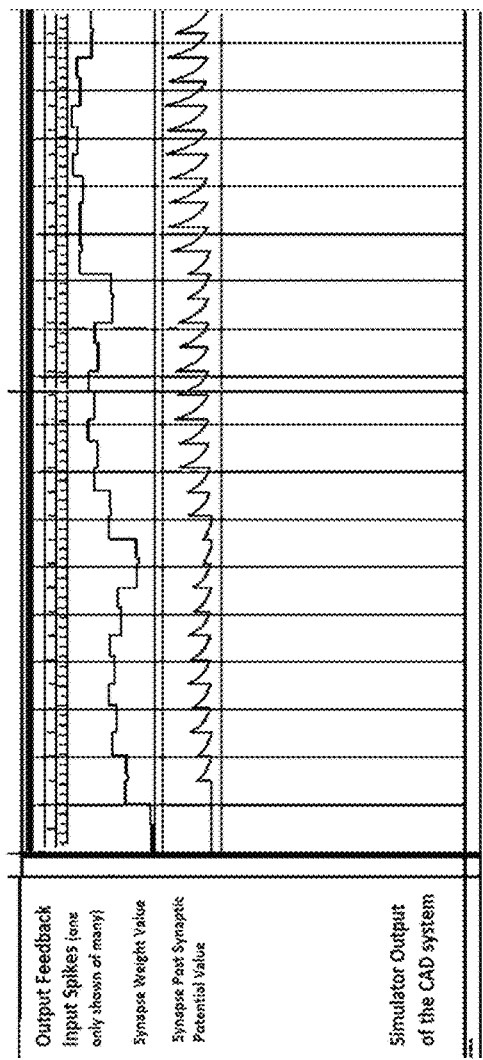
FIG. 5 shows a graph output representing CAD system simulation of synapse PSP behavior and STDP variation used by the first spiking neural network, in accordance with an embodiment of the present invention.

FIG. 5 shows a graph output representing a CAD (computer aided design) system simulation of synapse PSP behavior and STDP variation used in the first spiking neural network, in accordance with an embodiment of the present invention. The graph output 500 shows the behavior of a synapse Post-Synaptic Potential (PSP) value marked C in response to a spike stream marked A, and a resulting STDP weight variation marked B. PSP is a temporary change in the electric polarization of digital neuron. The integrated post-synaptic potential of many synapses can lead to the firing of a new spike impulse by the neuron.

Figure 6:
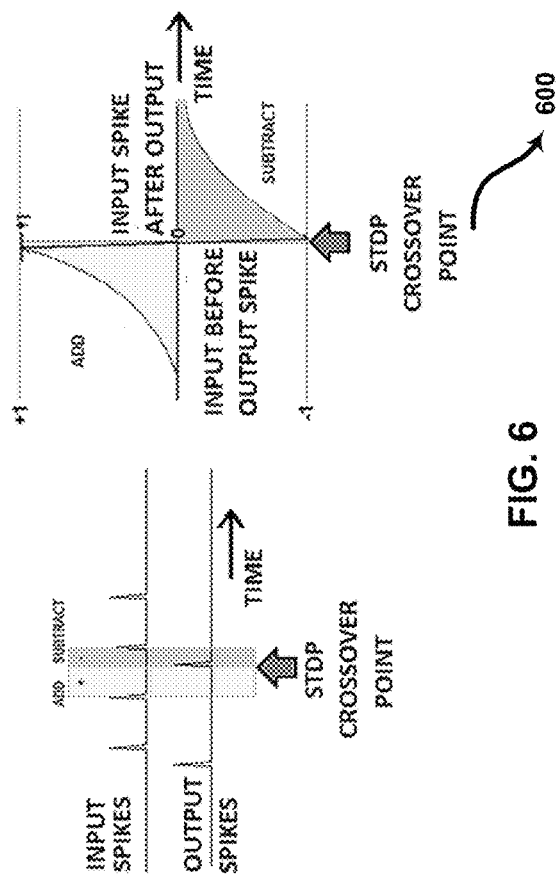
FIG. 6 shows Spike Timing Dependent Plasticity (STDP) implemented by the first spiking neural network in the system, in accordance with an embodiment of the present invention.

FIG. 6 shows Spike Timing Dependent Plasticity (STDP) implemented by the first spiking neural network in the system, in accordance with an embodiment of the present invention. The process of Spike Timing Dependent Plasticity 600 is used by the first spiking neural network 104 to spontaneously learn from repeating input patterns, for subsequent pattern feature extraction and recognition. Feedback of output pulses to synaptic inputs drives a process known as Synaptic Time Dependent Plasticity, commonly abbreviated as STDP, whereby the strength of a synapse is modified depending on the temporal difference of input to output pulses. This process is responsible for learning and memory functionalities in the first spiking neural network 104 of the system 300.

In an embodiment, all processes are performed in parallel in a digital hardware. Such as, a synapse circuit performs the functions that are known to occur in a biological synapse, namely the temporal integration of input spikes, modification of the 'weight' value stored in the synapse by the STDP circuit, decay of a post-synaptic potential value, and the increase of this post-synaptic potential value when a spike is received. A dendrite circuit performs a function that is known to occur in biological dendrites, namely the integration of the post-synaptic potential value output by a plurality of synapses. A soma circuit performs a function that is known to occur in biological neurons, namely the integration of values produced by two or more dendrite circuits. The axon is also performing a function known to occur in biological neurons, namely the creation of one or more spikes, in which each spike is a short burst of electrical energy also known as a pulse.

Each of the first spiking neural network 104 and the second spiking neural network 106 is composed of the first plurality of artificial neurons that are connected to other artificial neurons via a second plurality of configurable synapse circuits. Both the connectivity and the strength of synapses are configurable through digital registers that can be accessed externally. The weight value stored in the synapse changes over time through application of the STDP learning rule which is implemented in digital hardware.

Figure 7:
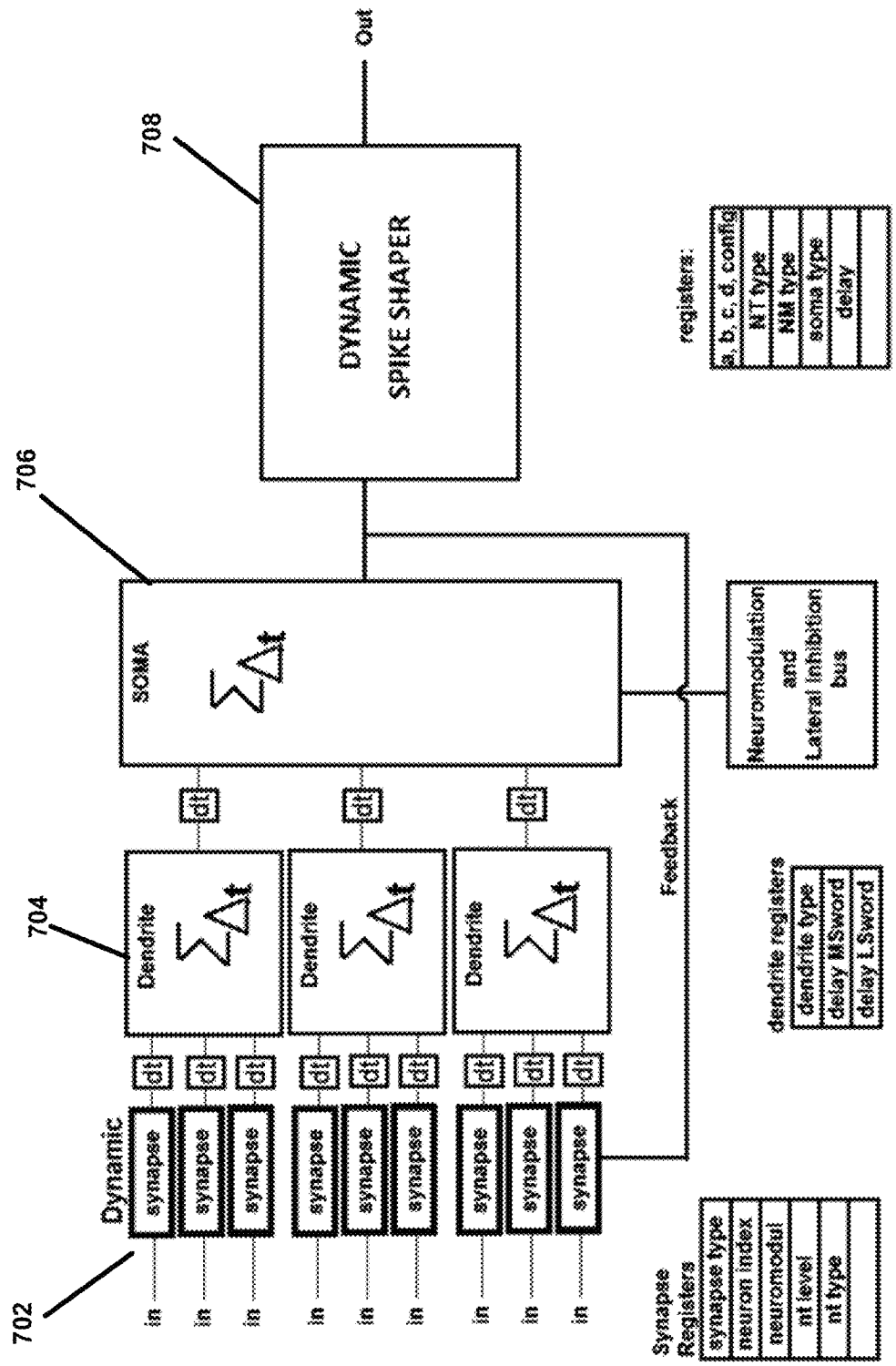
FIG. 7 shows a block diagram of the spontaneous learning spiking neuron and synapses implemented in the Spiking Neural Network in the system, in accordance with an embodiment of the present invention.

FIG. 7 shows a block diagram of the spontaneous learning spiking neuron and synapses implemented in the Spiking Neural Network in the system, in accordance with an embodiment of the present invention. The artificial neuron 700 comprises a plurality of synapse circuits 702 designated within, a plurality of dendrites 704, a soma circuit 706 and an axon circuit 708. There is no theoretical limitation to the number of synapses that can be connected to the soma circuit 706. An integration circuit is constructed from individual adder circuits that are incorporated within the synapse circuit 702 and connected to form an array adder circuit 704. The number of connected synapse circuits 702 is therefore flexible. The integrated sum is input to the soma circuit 706. Soma control constitutes a circuit that increases the threshold potential for a period after the soma has fired. The output of the soma circuit 706 is applied to the input of the axon circuit 708. The axon circuit 708 emits one or more output spikes governed by the strength of the soma output value. The digital neurons 406 present in the array 400 are connected where each synapse input and soma output is accessible. The digital neurons {0 . . . n} are connected to each other via synapses and receive a corresponding synaptic input through a number of synaptic circuits via a synapse input event bus. The output of the plurality of synapses 702 is integrated by dendrite circuits 704 and the soma circuit 706. The output of the soma circuit 706 is applied to the input of the axon circuit 708. Each of the digital neuron present in the array of artificial digital neurons 400 consists of the axon circuit 708. The axon circuit 708 emits one or more output spikes governed by the strength of the soma output value. From the axon circuit 708, events are generated for the next layer of digital neurons, or to output neurons in case the last neuron layer is an output layer, via status output bus. The output spike of the axon circuit 708 is transmitted to the plurality of connected synapses using a proprietary communication protocol in the next layer.

Each of the first spiking neural network and the second spiking neural network comprises of a plurality of artificial neurons forming an artificial neuron array. The digital neurons present in the array are connected where each synapse input and soma output is accessible. The digital neurons are connected to each other via synapses and receive a corresponding synaptic input through a number of synaptic circuits via a synapse input event bus. The output of the plurality of synapses is integrated by dendrite circuits and the soma circuit. The output of the soma circuit is applied to the input of the axon circuit. Each of the digital neuron present in the array of artificial digital neurons consists of the axon circuit. The axon circuit emits one or more output spikes governed by the strength of the soma output value. From the axon circuit, events are generated for the next layer of digital neurons, or to output neurons in case the last neuron layer is an output layer, via status output bus. The output spike of the axon circuit is transmitted to the plurality of connected synapses using a proprietary communication protocol in the next layer.

A digital neuron consists of dendrites that receive one or more synaptic inputs and the axon that shapes an output spike signal. Neurons are connected through synapse that receives feedback from the post-synaptic neuron which causes the efficacy of the connection to be modified. The output of the plurality of synapses is integrated by dendrite circuits and the soma circuit. The output of the soma circuit is applied to the input of an axon circuit. The axon circuit emits one or more output spikes governed by the soma output value. The output spike of the axon circuit is transmitted to the plurality of synapses in the next layer. Spontaneous learning occurs when a synaptic strength value within the system is increased or decreased as a result of a temporal difference of an input spike temporally related to a soma feedback output spike. Each of the first digital Spiking Neural Network 104 and the second digital spiking neural network 106 comprises a plurality of digital artificial neurons connected to each other through digital synapses connected as a hierarchical Artificial Neural Network. Further, each of the plurality of digital artificial neuron comprises of binary logic gates.

Figure 8:
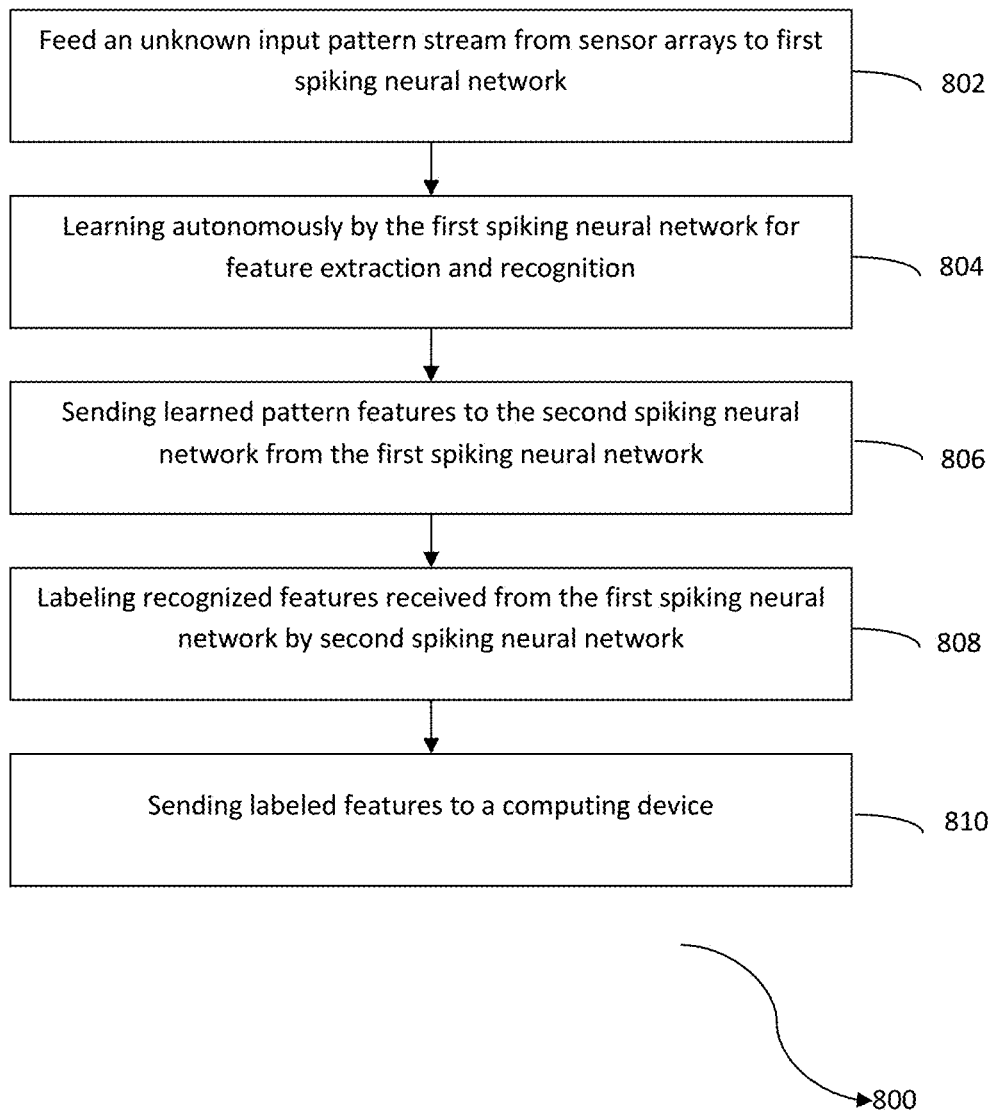
FIG. 8 illustrates a flowchart showing a method of spontaneous learning and output labelling by a system of neural networks, in accordance with an embodiment of the present invention.

FIG. 8 illustrates a flowchart showing a method of spontaneous learning and output labeling by a system of neural networks, in accordance with an embodiment of the present invention. The method 800 comprises feeding an input data stream containing unknown patterns from a variety of sensors from the sensor array 302 to the first spiking neural network 104, at step 802. The first spiking neural network 104 comprises a plurality of digital artificial spiking neurons; each of the plurality of digital spiking neurons comprises of binary logic gates and is interconnected to other artificial spiking neurons through dynamic artificial synapses. The first spiking neural network 104 is connected by means of dynamic sensory neurons 304 to the variety of sensors from the sensor array 302 that provide a defined, but unlabeled pattern stream. In some instances, the sensor array 302 is connected directly to the first spiking neural network 104, where the sensor array 302 provides a stream of temporal and spatially distributed spikes, comprising of defined but unlabeled pattern streams.

The first spiking neural network 104 learns spontaneously from input any repeating pattern at step 804, and uses the resulting synaptic weight values for pattern feature extraction and recognition. The first spiking neural network 104 is configured to learn spontaneously from repeating patterns in the input stream, either by applying the input data stream 306 or from spikes generated in the sensor array 302, by means of a learning method known as Synaptic Time Dependent Plasticity and lateral inhibition, thereby creating a knowledge domain comprised of a plurality of weights representing learned and recognized features arising in the input data stream. The information consisting of spikes timed to the occurrence of recognized features is then passed to the second spiking neural network 106 that comprises a monitoring means at step 806.

The second spiking neural network 106 labels the recognized features, received as timed spikes from the first spiking neural network 104 at step 808. The second spiking neural network 106 is trained to identify output from the first spiking neural network 104 that meets the predetermined criteria. The second spiking neural network 106 acts as a labeling network that produces an input-output map within a predetermined knowledge domain. Therefore, output of the second spiking neural network 106 is a labeled data. Spikes, representing the labeled data or the labeled features are sent to a computing device, such as a central processing unit (CPU) for post processing 110 at step 810.

FIG. 9 illustrates a CAD (computer aided design) system simulation output chart 900, showing the behavior of synapses, dendrites, soma and axon hillock, in accordance with an embodiment of the present invention.

In an embodiment of the present invention, the system can be applied to spontaneously extract features from a large variety of data sources. Examples of such data sources can be defined as streamed data received from the Internet, such as Financial Information exchange (FIX) market data or the visual recognition of objects in a video stream. Another example is defined as the data that originates from various analog or digital sensors, such as vision sensors, digital microphones, tactile pressure sensors, chemical sensors and other types of sensors or data sources. The data may be received in form of binary spikes, or as multibit binary variables that are converted to spikes by means of digital sensory neurons. The data is received in real-time but may also be in form of a recording. Once the system has learned features present in the input data stream, the system is capable of recognizing these features. The learned properties of the digital neurons and synapses can be stored externally or locally in a library file. The library file can be uploaded by other similarly configured systems in order to instantaneously assimilate the learned features.

The invention claimed is:

1. A digital system for spontaneous machine learning and feature extraction, the system comprising:
    digital hardware circuitry that includes a hierarchical arrangement of a first artificial neural network and a second artificial neural network, wherein the first artificial neural network spontaneously learns to recognize any repeating patterns in an input stream and the second artificial neural network is trained to interpret and label the repeating patterns recognized by the first artificial neural network,
    wherein the first artificial neural network includes a plurality of digital neuron circuits, a plurality of digital synapse circuits, and an address event representation (AER) bus, the first artificial neural network being connected to the input stream via the AER bus, the input stream comprising temporally and spatially distributed spikes encoded on the AER bus;
    wherein the first artificial neural network transmits spikes to the second artificial neural network, the spikes representing the recognized repeating patterns learned from the input stream; and
    wherein the plurality of digital neuron circuits are interconnected using the plurality of digital synapse circuits, and wherein interconnectivity and strength of the plurality of digital synapse circuits are configurable through digital registers that are externally accessed.

2. The system of claim 1, wherein the first artificial neural network spontaneously learns any repeating patterns through Spike Timing Dependent Plasticity and lateral inhibition.

3. The system of claim 1, wherein the first artificial neural network and the second artificial neural network is a single layered or a multilayered hierarchical spiking neural network.

4. The system of claim 1, wherein to label the repeating pattern by the second artificial neural network, the second artificial neural network is configured to map temporally and spatially distributed spikes, generated by the first artificial neural network and representing learned features, to output labels within a predetermined knowledge domain.

5. The system of claim 1, further comprising an input unit having a network of artificial sensory neurons connected to the first artificial neural network, the input unit configured to convert data captured in a form of digital values or analog values by a sensor array into temporally and spatially distributed spikes.

6. The system of claim 5, wherein the sensor array comprises a plurality of sensors for capturing data of interest and generating the input stream.

7. The system of claim 1, wherein the second artificial neural network comprises a plurality of digital neuron circuits interconnected by a plurality of synapse circuits.

8. The system of claim 1, wherein the first artificial neural network spontaneously learns any repeated pattern by using Spike Timing Dependent Plasticity and lateral inhibition to create a predetermined knowledge domain comprising a plurality of synaptic weights representing learned features in the input stream.

9. The system of claim 1, wherein the second artificial neural network is configured to function in a supervised manner and is trained to produce input/output maps within a predetermined knowledge domain.

10. The system of claim 1, wherein the second artificial neural network comprises a monitoring means to identify outputs that meet predefined criteria.

11. The system of claim 1, wherein the second artificial neural network transmits output labels to a computing device for post processing.

12. The system of claim 6, wherein the plurality of sensors include at least one of an analog sensor, a digital sensor, a vision sensor, a digital microphone, a tactile pressure sensor, a chemical sensor, or a sensor that is receptive to signals that are outside of human perception.

13. A method for spontaneously extracting features in an artificial neural network system, the method comprising:
    (a) feeding an input pattern stream from a sensor or an external source to a first artificial neural network, wherein the first artificial neural network includes a plurality of digital neuron circuits, a plurality of digital synapse circuits, and an address event representation (AER) bus, the first artificial neural network being connected to the input pattern stream via the AER bus, the input pattern stream comprising temporally and spatially distributed spikes encoded on the AER bus;
    (b) learning, spontaneously, by the first artificial neural network to recognize any repeating patterns in the input pattern stream and subsequently perform feature extraction;
    (c) sending temporally and spatially distributed spikes, representing the recognized patterns to a second artificial neural network from the first artificial neural network;
    (d) labeling the recognized pattern received from the first artificial neural network, by second artificial neural network; and
    (e) sending labeled data, representing learned and recognized patterns to a computing device for post processing,
    wherein the learning, the sending temporally and spatially distributed spikes, and the sending labeled data are performed, at least in part, by digital hardware circuitry, and
    wherein the plurality of digital neuron circuits are interconnected using the plurality of digital synapse circuits, and wherein interconnectivity and strength of the plurality of digital synapse circuits are configurable through digital registers that are externally accessed.

14. The method of claim 13, wherein the second artificial neural network comprises a plurality of digital neuron circuits interconnected by a plurality of synapse circuits.

15. The method of claim 13, wherein the first artificial neural network and the second artificial neural network comprise either a single layer or multilayer of digital neuron circuits.

16. The method of claim 13, wherein the first artificial neural network spontaneously learns any repeated pattern by using Spike Timing Dependent Plasticity and lateral inhibition to create a knowledge domain comprising a plurality of synaptic weights representing learned features in the input pattern stream.

17. The method of claim 13, wherein the second artificial neural network is configured to function in a supervised manner and is trained to produce input/output maps within a predetermined knowledge domain.

18. The method of claim 13, wherein the second artificial neural network comprises a monitoring means to identify outputs that meet some predefined criteria.

19. The method of claim 13, wherein the second artificial neural neuron network transmits the output labels to the computing device for post processing.

* * * * *